United States Patent
Dusterhoft et al.

(10) Patent No.: US 11,506,037 B2
(45) Date of Patent: *Nov. 22, 2022

(54) LIQUEFIED NATURAL GAS (LNG) RE-FRACTURING

(71) Applicant: Halliburton Energy Services, Inc., Houston, TX (US)

(72) Inventors: Ronald G. Dusterhoft, Katy, TX (US); Neil A. Stegent, Cypress, TX (US); Enrique A. Reyes, Tomball, TX (US); Doug W. Walser, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 790 days.

This patent is subject to a terminal disclaimer.

(21) Appl. No.: 16/330,418

(22) PCT Filed: Nov. 11, 2016

(86) PCT No.: PCT/US2016/061692
§ 371 (c)(1),
(2) Date: Mar. 5, 2019

(87) PCT Pub. No.: WO2018/089021
PCT Pub. Date: May 17, 2018

(65) Prior Publication Data
US 2020/0340341 A1 Oct. 29, 2020

(51) Int. Cl.
*E21B 43/26* (2006.01)
(52) U.S. Cl.
CPC ...... *E21B 43/2605* (2020.05); *E21B 43/2607* (2020.05)

(58) Field of Classification Search
None
See application file for complete search history.

(56) References Cited

U.S. PATENT DOCUMENTS

| | | | |
|---|---|---|---|
| 7,560,690 B2 | 7/2009 | Stray et al. | |
| 2003/0051875 A1 | 3/2003 | Wilson | |
| 2013/0312976 A1 | 11/2013 | Shirley | |
| 2014/0000891 A1* | 1/2014 | Mahoney | C09K 8/62 166/280.2 |
| 2014/0008074 A1* | 1/2014 | Nevison | C09K 8/62 166/308.6 |

(Continued)

FOREIGN PATENT DOCUMENTS

| | | |
|---|---|---|
| WO | 2012097424 A1 | 7/2012 |
| WO | 2014152251 A1 | 9/2014 |

OTHER PUBLICATIONS

Peza et al.; 3-D Integrated Workflow for Understanding the Fracture Interference and Its Impact into the Gas Production of the Woodford Shale; URTeC; 1-26 (Year: 2014).*

(Continued)

*Primary Examiner* — Anuradha Ahuja
(74) *Attorney, Agent, or Firm* — K&L Gates LLP

(57) ABSTRACT

A method and system for pressurizing and stimulating a formation with a parent well therethrough, the method including storing and de-liquefying liquefied natural gas (LNG) at an on-site location near the parent well, injecting a first stream of de-liquefied LNG into the parent well to pressurize the formation, and injecting a second stream of de-liquefied LNG into the parent well at a fracturing pressure sufficient to fracture the pressurized formation.

20 Claims, 7 Drawing Sheets

(56) References Cited

U.S. PATENT DOCUMENTS

| | | | |
|---|---|---|---|
| 2015/0337639 A1 | 11/2015 | Nevison et al. | |
| 2016/0160115 A1 | 6/2016 | Gamage et al. | |
| 2016/0312594 A1 | 10/2016 | Kuchuk et al. | |
| 2016/0369611 A1* | 12/2016 | Bragg | C09K 8/62 |
| 2017/0321530 A1* | 11/2017 | Gentry | E21B 43/26 |
| 2018/0355707 A1* | 12/2018 | Rodriguez Herrera | G01V 1/50 |

OTHER PUBLICATIONS

International Search Report and Written Opinion dated Aug. 2, 2017 for PCT Application No. PCT/US2016/061692 filed Nov. 11, 2016, 15 pages.

Walser, Doug, et al, "Quantifying and Mitigating the Impact of Asymmetric Induced Hydraulic Fracturing from Horizontal Development Welbores", Society of Petroleum Engineers "aka" SPE-181656-MS, Annual Technical Conference and Exhibition held in Dubai, UAE, Sep. 26-28, 2016, 13 pages.

Walser, Doug, et al, "Leveraging Subsurface Insight, Screening, and Diversion Technology in Refracturing", Technology Update, JPT, Jan. 2016, 3 pages.

Mcintyre, F.J., et al., "Radioactive Tracers Monitor Solvent Spreading in Rainbow Vertical Hydrocarbon Miscible Flood", SPE 14440 Reservoir Engineering, Feb. 1988, pp. 273-280.

Schmidt, Michael, "Innovative Unconventional EOR-A LightEOR an Unconventional Tertiary Recovery Approach to an Unconventional Bakken Reservoir in Southeast Saskatchewan", 21 World Petroleum Congress, Moscow 2014, 12 pages.

Li, Lei, et al., "Optimization of Huff-n-Puff Gas Injection to Enhance Oil Recovery in shale Reservoirs", Society of Petroleum Engineers "aka" SPE-180219-MS, Denver, Colorado, May 5-6, 2016, 18 pages.

Xueqing, Tang, et al., "Innovative In-situ Natural Gas Huff "n" Puff in the same Wellbore for Cost-effective Development: A Case Study in Sudan", SPE-144836, Kuala Lumpar, Malaysia, Jul. 19-21, 2011, 6 pages.

Wan, T., et al., "Effect of Fracture Characteristics on Behavior of Fractured Shale-Oil Reservoirs by Cyclic Gas Injection", (SPE-168880), May 2016 SPE Reservoir Evaluation & Engineering, pp. 350-355.

Li, Lei, et al., "Experimental and Numerical Upscale Study of Cyclic Methane Injection to Enhance Shale Oil Recovery", AIChE 425710, Nov. 2015, 13 pages.

* cited by examiner

US 11,506,037 B2

LIQUEFIED NATURAL GAS (LNG) RE-FRACTURING

BACKGROUND

This section is intended to provide relevant background information to facilitate a better understanding of the various aspects of the described embodiments. Accordingly, it should be understood that these statements are to be read in this light and not as admissions of prior art.

A reservoir volume through a parent well ("original well") may be under sufficient pressure to flow fluids, such as oil, gas, and hydrocarbons, to a surface. As the fluids are produced, the pressure in the reservoir volume will often decline, and production from the parent well is reduced or halted. If an infill well, such as a child well, is completed before the reduced-pressure reservoir volume through the parent well is re-pressured, asymmetrical fractures from the child well may propagate in the direction of the parent well. In such cases, natural gas may be used to partially or fully re-pressurize the reduced-pressure reservoir volume.

A natural gas pipeline system begins at a natural gas producing wellhead or field. Transporting the natural gas used for re-pressuring from the wellhead to a point of use involves several physical transfers of custody and multiple processing steps. Depending upon the initial quality of the wellhead product, a pipeline gathering system directs the flow of the natural gas to a processing plant. During processing, the natural gas is subjected to various extraction processes to remove water and other impurities and contaminants. After cleaning, the natural gas is directed to a mainline transmission grid to be distributed to the point of use.

However, due to its volume, natural gas is not easily stored or moved by various modes of transportation, such as railways or tankers, and is usually transported through an extensive, yet complex, network of pipelines. The natural gas pipeline system in the United States alone includes 305,000 miles of interstate and intrastate transmission pipe, more than 1,400 compressor stations to maintain pressure of the network, and more than 11,000 delivery points, 5,000 receipt points, and 1,400 interconnection points to provide transfer of the natural gas.

BRIEF DESCRIPTION OF THE DRAWINGS

For a detailed description of the embodiments of the invention, reference will now be made to the accompanying drawings in which.

DETAILED DESCRIPTION

Figure 1:
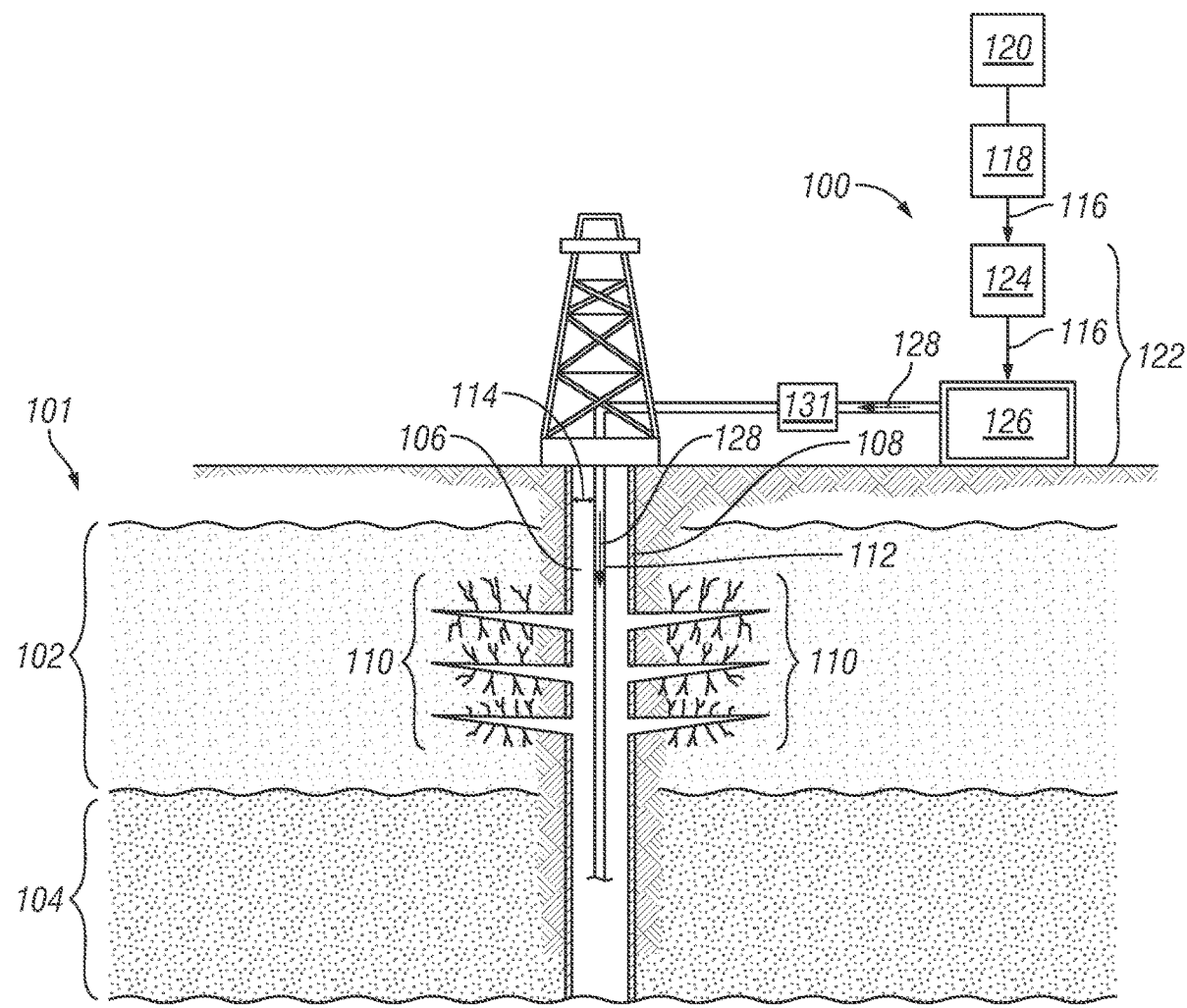
FIG. 1 is a schematic view of an example liquefied natural gas ("LNG") pressuring system for pressuring a formation, according to one or more embodiments.

FIG. 1 is a schematic view of an example liquefied natural gas ("LNG") pressuring system 100 for pressuring a formation 101, according to one or more embodiments. The formation 101 includes reservoir volumes 102, 104 composed of porous and permeable rocks (i.e., reservoir rocks) that contain reservoir fluids (e.g., oil, gas, water, hydrocarbons) located in an onshore environment or in an offshore environment. A well system includes at least one well 106 drilled to penetrate the formation 101 to carry out exploration and extraction of fluids from the reservoir volumes 102, 104. The well 106 of FIG. 1 is shown as near-vertical, but can be formed at any suitable angle to reach a hydrocarbon-rich portion of the formation 101. In other examples, the well 106 can follow a partially-vertical, angled, or even a partially-horizontal path through the formation 101. The well 106 is shown as being lined with a protective lining 108 extending through the formation 101. The protective lining 108 may include a casing, liner, or tubing made of any material, including steel, alloys, or polymers, among others. The well 106 may also be partially or fully openhole, i.e., no protective lining. The protective lining 108 is perforated so that the reservoir fluids flow through fractures 110 formed in the formation 101 and into the well 106.

During primary recovery techniques (e.g., natural depletion), reservoir pressure is sufficient so that reservoir fluids can flow from the fractures 110 and into the well 106. As described herein, the reservoir pressure includes the pressure of the fluids present in pore spaces of the reservoir rocks. As the reservoir fluids are produced from the reservoir rocks, the pressure, flow capacity, and recovery factor from the reservoir volume 102 is reduced until production from the well 106 is minimal or no longer feasible. Since the reservoir volume 102 may contain oil that has been relieved of pressure such that the oil is near, at, or below its bubble point, natural gas can be injected into the well 106 to increase pressures to a level equal to or greater than the original reservoir pressures, for example, pressures exhibited at original production conditions. The terms pressured, re-pressured, pressurized, and re-pressurized are used interchangeable herein to imply that reservoir volume pressures are increased or restored to pressure levels occurring during initial recovery from the well 106.

In operation, the natural gas is injected into the well 106 to flow into a tubing string 112 or an annular area 114 located between an inner surface of the well 106 and the string 112. Specifically, the natural gas introduced into the formation 101 is miscible and/or displaced in the fluids of the reservoir volume 102 to help mobilize and flow the fluids from the volume 102 and into the well 106. Natural gas, as opposed to water, includes a miscibility that is greater in reservoir fluids than the miscibility of water in such fluids. In particular, the molecules of the injected natural gas are capable of mixing or dissolving within the reservoir fluids to lower fluid viscosity and, thus, subsequently assist in the production of higher volumes of reservoir fluids from the volume 102. Further, the natural gas mixed or dissolved within the reservoir fluids can be released, for instance, using liberation techniques. Thus, unlike water, a portion of the natural gas used to pressurize the reservoir volume 102 can be recovered and later sold and/or further used in other operations.

However, before the natural gas is transported for use via remote pipelines or other remote transportation methods, heavier hydrocarbons and contaminants are often extracted to produce a processed natural gas. In a gaseous form, the low density and flammable nature of the processed natural gas presents various challenges during transportation to the point of use, i.e., the well 106. However, natural gas can be compressed in volume and cooled to or below cryogenic temperatures, e.g., −260 Fahrenheit (° F.) (−162 Celsius (° C.)), to produce liquefied natural gas ("LNG") 116. The reduction in volume enables natural gas to be transported in liquid form across extended distances and to remote locations where pipelines are not available.

The LNG pressuring system 100 includes a LNG source vessel 118 to store LNG 116 on-site at the well 106. The storage of LNG at the well 106 reduces the distance between the source of the natural gas, e.g., remote pipelines, supply and the point of injection into the well 106 and thus, overcomes any challenges associated with using and transporting natural gas. The LNG source vessel 118 includes a cooling system or a separate cooling system 120 located at the well 106 to maintain the LNG 116 at cryogenic temperatures. The LNG source vessel 118 is further in fluid communication with a cryogenic system 122 capable of de-liquefying the LNG 116 to a gaseous state. The cryogenic system 122 includes a cryogenic pump 124 capable of processing fluids at cryogenic temperatures. The cryogenic pump 124 supplies a feed pressure to flow the LNG 116 into a heating unit 126 to be heated and vaporized into natural gas, e.g., de-liquefied LNG 128. Once in a gaseous state, the de-liquefied LNG 128 may flow into the well 106 to increase the reservoir pressure of the reservoir volume 102. In some cases, an injection pump 131 pressurizes the de-liquefied LNG 128 to maintain an injection flow rate sufficient to inject and deliver the LNG 128 into the well 106 and further into the fractures 110.

The LNG 116 transported to the well 106 may already be processed and thus, free of contaminants including water, hydrogen sulfide, and carbon dioxide, among others. In other examples, the LNG 116 stored in the LNG source vessel 118 may be processed at the well 106 or requires additional processing so that additional equipment may be located at the well 106. However, equipment in contact with the LNG 116 must be suitable for cryogenic service, i.e., suitable to handle cryogenic temperatures, e.g., at or below −260° F. (−162° C.).

It should be clearly understood that the LNG pressuring system 100 of FIG. 1 is merely one embodiment of an application of the principles of this disclosure in practice, and a wide variety of other embodiments are possible. Therefore, the scope of this disclosure is not limited at all to the details of FIG. 1 described herein and/or depicted in the additional drawings.

Figure 2A:
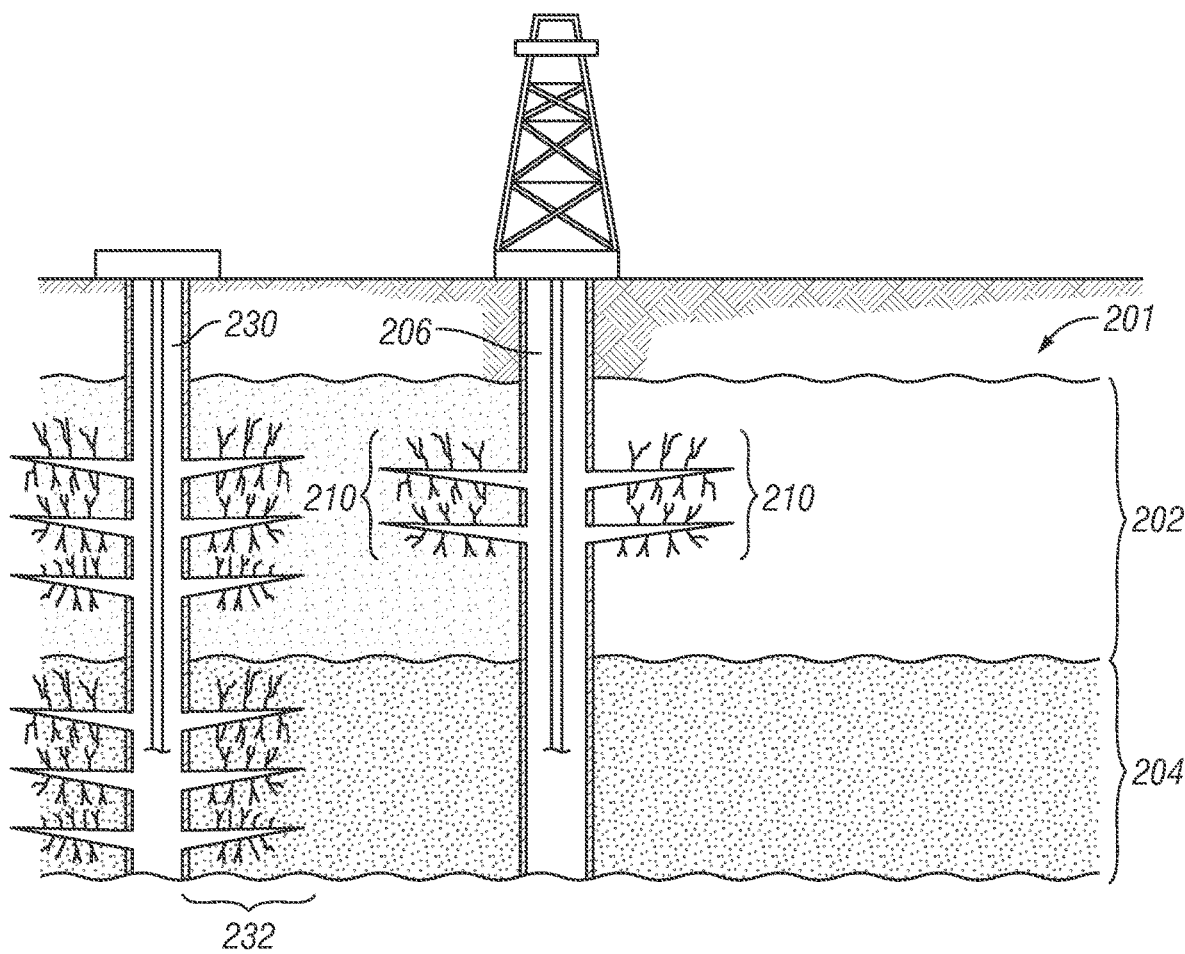
FIG. 2A is a schematic view of a subterranean formation before pressuring a reservoir volume, according to one or more embodiments.

FIG. 2A is a schematic view of a subterranean formation 201 before pressuring a reservoir volume 202, according to one or more embodiments. An initial well drilled to discover and produce fluids from one or more reservoir volumes 202, 204 is often referred to as a parent well 206. As fluids are recovered from the reservoir volume 202 through the parent well 206, the reservoir pressure decreases so that the reservoir volume 202 is referred to as a "depleted" reservoir volume. As described herein, a depleted reservoir volume includes reservoir pressures that have been reduced due to production, production from other producing wells, or due to low permeability of the formation 201. The reduction in pressure limits the recovery of reservoir fluids that may remain in the reservoir volume 202 after implementing primary recovery techniques, such as natural pressure recovery. Other recovery techniques, such as artificial lift recovery, water injection recovery, or steam injection recovery, among others, may be implemented to further produce and recover the fluids from the reservoir volume 202 or fluids from an adjacent reservoir volume 204. In some cases, a child well 230 is drilled and completed in a producing area or between a producing well(s), such as the parent well 206, to sustain rates or contact portions of one or more reservoir volumes 202, 204 that are inadequately drained or untouched using existing production methods. To promote production, the child well 230 is stimulated to produce fluids unrecovered from the reservoir volume 202, not easily accessible through the parent well 206, and/or fluids from the adjacent reservoir volume 204.

However, during stimulation of the child well 230, asymmetrically induced fractures 232 may generate to propagate in the direction of the reservoir volume 202, i.e., the depleted reservoir volume. Specifically, the asymmetrically induced fractures 232 generated in the child well 230 migrate to lower pressure, i.e., lower stress, zones of the formation 201, such as the reservoir volume 202, or any other previously depleted well(s) with a low reservoir pressure. The fractures 232 of the child well 230 follow the path of least resistance or the path that requires less fracture energy, thus, resulting in the asymmetric fracture pattern. As shown in FIG. 2A, the asymmetrically induced fractures 232, as described herein, can include fractures that grow preferentially on one side of the child well 230 in the direction of the reservoir volume 202. Such asymmetric fracture growth restricts the fractures 232 from generating on another side of the child well 230 or fracturing in the direction of other producing reservoirs, such as the reservoir volume 204 that is pressured and capable of producing reservoir fluids. As a result, the reservoir volume 204 may be bypassed or untouched due to the asymmetric induced fractures 232 propagating in the direction of the reservoir volume 202.

Figure 2B:
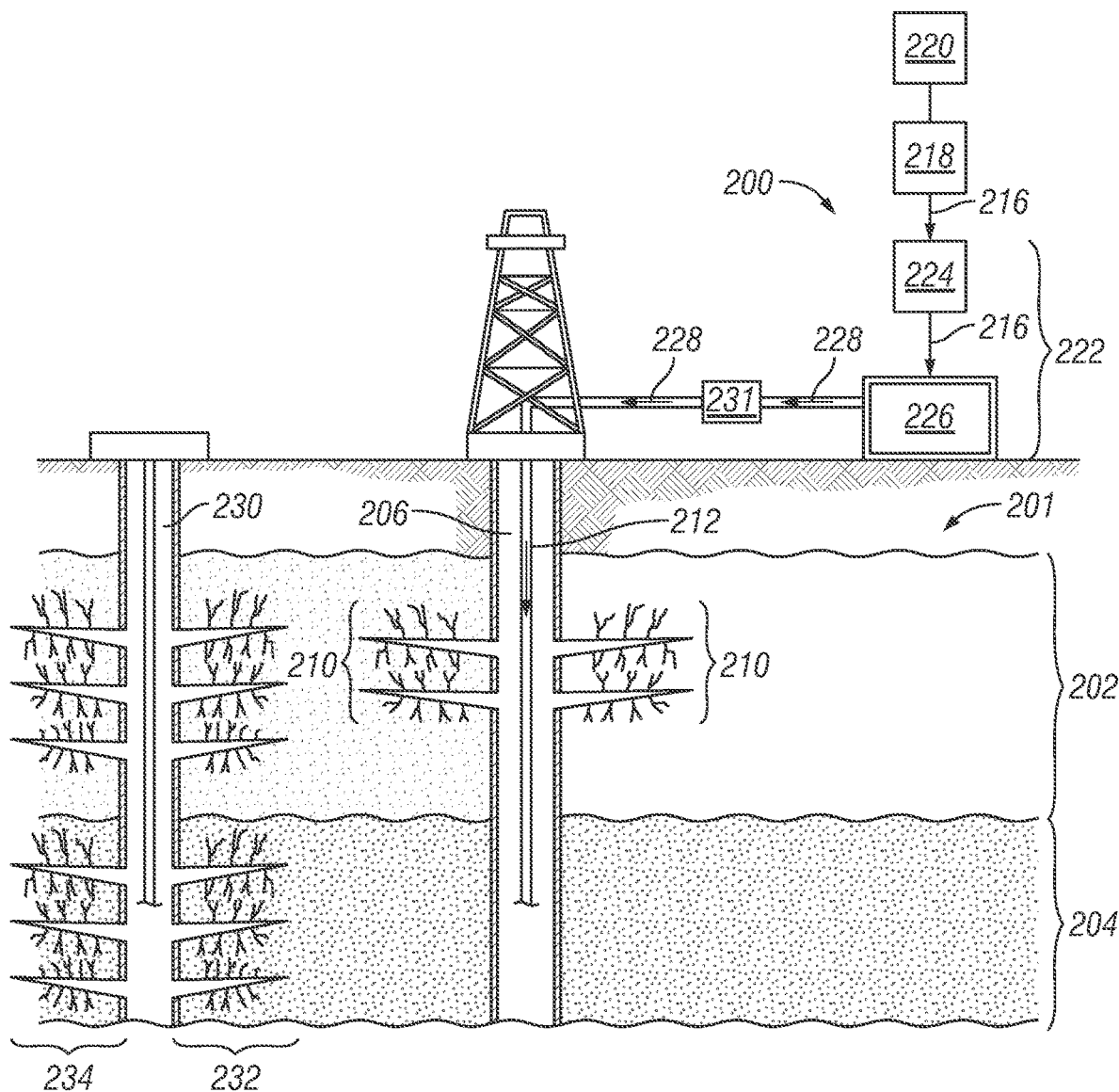
FIG. 2B is a schematic view of a subterranean formation after pressuring the reservoir volume of FIG. 2A using an example LNG pressuring system, according to one or more embodiments.

FIG. 2B is a schematic view of a subterranean formation 201 after pressuring the reservoir volume 202 of FIG. 2A using a LNG pressuring system 200, according to one or more embodiments. As described with respect to FIG. 1, the reservoir volume 202 can be pressurized using the LNG pressuring system 200, for example, to pre-recovery reservoir pressures using LNG 216 before completion and/or stimulation of a child well 230. The system 200 includes a LNG source vessel 218 to store the LNG 216 and a cooling system or a separate cooling system 220 located at the well 206 to maintain the LNG 216 at or below cryogenic temperatures, e.g., −260° F. (−162° C.). The LNG source vessel 218 supplies the LNG 216 to a cryogenic system 222 capable of de-liquefying and returning the LNG 216 to a gaseous state. The cryogenic system 222 includes a cryogenic pump 224 to supply a feed pressure to flow the LNG 216 into a heating unit 226. The unit 226 heats and vaporizes the LNG 216 into natural gas, i.e., de-liquefied LNG 228. Once in a gaseous state, the de-liquefied LNG 228 flows into the well 206 via a tubing string 212 to increase the reservoir pressure of the reservoir volume 202. In some cases, an injection pump 231 pressurizes the de-liquefied LNG 228 to maintain an injection flow rate sufficient to deliver and inject the de-liquefied LNG 228 into the well 206. In the embodiments, the storage of LNG 216 at the well 206 reduces the distance between the natural gas supply source (e.g., remote natural gas pipelines) and the point of injection into the well 206 for various operations, such as the pressuring of the reservoir volume 202. In this way, storage of LNG 216 at the well 206 overcomes any challenges associated with using natural gas, remote pipelines, and other remote transportation methods.

After injecting the de-liquefied LNG 228 to increase the pressures of the reservoir volume 202, the child well 230 may be drilled or if already drilled, it may be completed. Upon stimulation of the child well 230, asymmetric fracturing from the child well 230 towards the parent well 206, as previously shown in FIG. 2A, is mitigated. Instead, stimulation of the child well 230 generates more symmetric fractures 234 that do not grow in an unbalanced pattern towards the re-pressurized reservoir volume 202. Instead, the symmetric fractures 234 may propagate in a balanced direction towards the reservoir volume 204 that is capable of producing reservoir fluids and also in the direction of the re-pressurized reservoir volume 202, if capable of producing fluids into the well 206. Thus, re-pressuring the reservoir volume 202 before stimulating the child well 230 promotes symmetric fracturing upon stimulating the child well 230 that is balanced and does not grow into lower pressure/lower stressed areas of the formation 201, i.e., a depleted reservoir volume such as the reservoir volume of FIG. 2A. As described herein, symmetrically induced fracturing includes fractures 234 growing simultaneously upward and downward, or along one or more sides of the child well.

It should be clearly understood that the embodiments described with respect to FIGS. 2A and 2B include merely one example of an application of the principles of this disclosure in practice, and a wide variety of other embodiments are possible. Therefore, the scope of this disclosure is not limited at all to the details of FIGS. 2A and 2B described herein and/or depicted in the additional drawings.

Figure 3A:
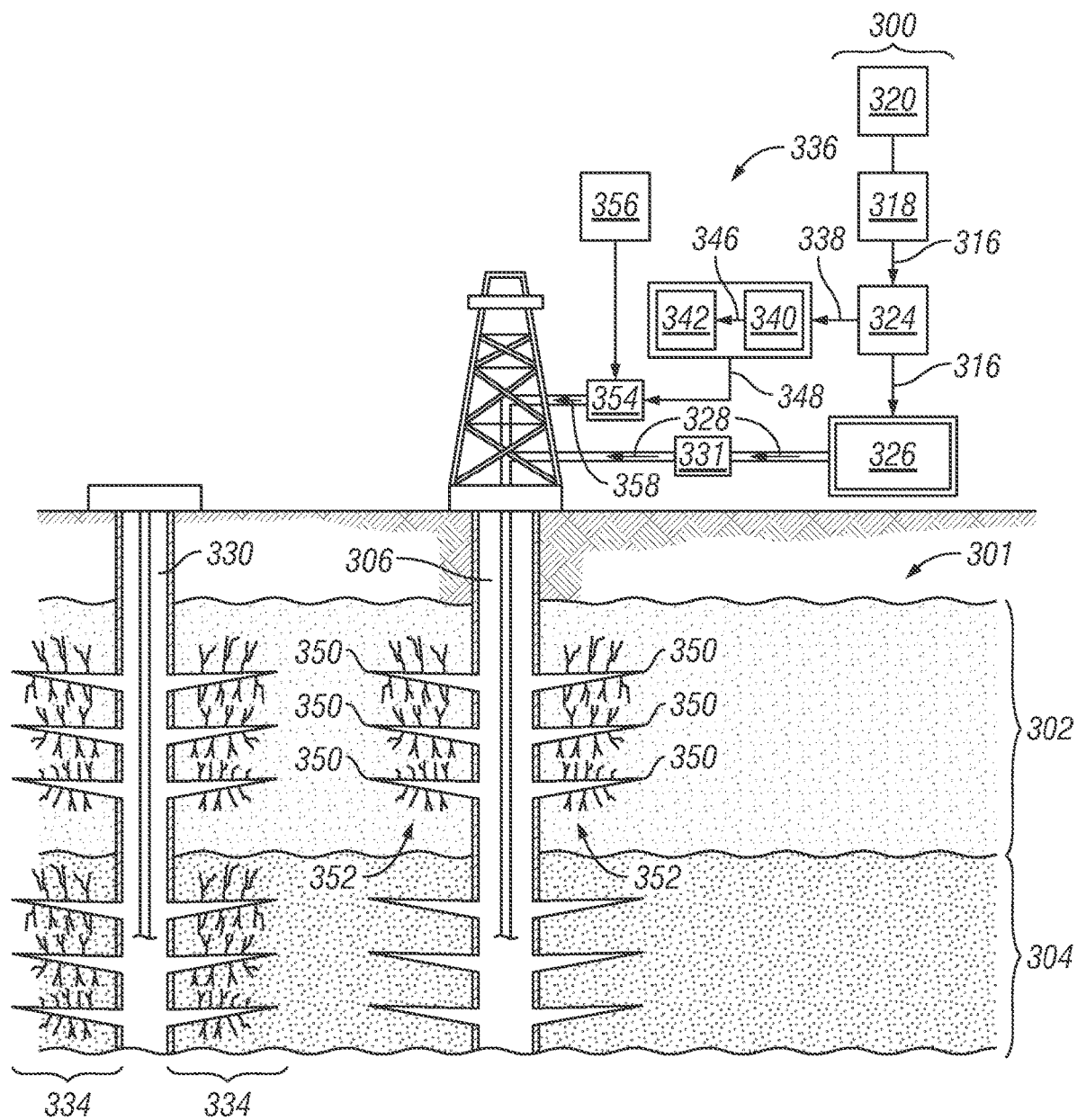
FIG. 3A a schematic view of an example LNG pressuring system and an example fracturing pump system, according to one or more embodiments.

FIG. 3A a schematic view of a LNG pressuring system 300 and a fracturing pump system 336, according to one or more embodiments. Pressuring a previously depleted reservoir volume 302 before stimulating a child well 330, re-establishes a pathway for any remaining reservoir fluids to flow from the reservoir volume 302. Thereafter, the pressured reservoir volume 302 may be re-stimulated to subsequently produce and flow the remaining reservoir fluids into an original well, i.e., a parent well 306.

A reduction in the pressure in the reservoir volume 302 through the parent well 306 can lead to asymmetrically-induced fracturing in the direction of the well 306 during stimulation of an adjacent reservoir volume(s), e.g., 304. As described with respect to FIG. 1, the reservoir volume 302 is re-pressurized to restore reservoir volume pressures to pre-production levels using LNG 316 returned to a gaseous state. The LNG 316 is stored in a LNG source vessel 318 located at the well 306 that includes a cooling system 320 to maintain the LNG 316 at or below cryogenic temperatures, e.g., −260° F. (−162° C.). The LNG source vessel 318 is in fluid communication with a cryogenic pump 324 capable of supplying a feed pressure to flow a first stream of LNG 316 into a heating unit 326. The heating unit 326 heats and vaporizes the LNG 316 into natural gas, i.e., de-liquefied LNG 328. The de-liquefied LNG 328, thereafter, flows into the well 306 to increase the reservoir pressure or re-pressurize the reservoir volume 302 and thus, mitigates asymmetrically-induced fracturing in the direction of the parent well 306.

After the reservoir volume 302 is pressurized, fractures 334 propagate away from the child well 330 to grow symmetrically into previously bypassed reservoirs, for example, the adjacent reservoir volume 304. However, the fracturing fluid injected into the child well 330 during stimulation may flow into and infiltrate the pressured reservoir volume 302, now capable of being re-stimulated. The infiltrating fracturing fluid from the child well 330 reduces and/or destroys any remaining producible fluids and reserve fluids of the reservoir volume 302.

Various stimulation techniques, such as fracturing techniques, are implemented to re-stimulate the reservoir volume 302 and recover any remaining fluids in the parent well 306 after stimulating the child well 330. Fracturing, a type of stimulation technique, includes creating a fracture system in the reservoir volume 302 by injecting fluid(s) under pressure into the well 306 to overcome stress and cause material failure of the volume 302. Certain fluids injected into the well 306 to re-stimulate production, such as water, nitrogen and carbon dioxide, may damage reservoir rocks and/or cause formation contamination during recovery of such fluids from the formation 301 and/or the well 306. For example, water retention due to higher capillary forces within the reservoir volume 302 can affect the reservoir volume permeability, reservoir volume wettability, and the geophysical integrity of the well 306 and/or formation 301 in the form of fines migration, deconsolidation, and rock weakening and softening. Such factors affect the ability of the fluids to be released and recovered from the reservoir volume 302. However, the de-liquefied LNG 328 is non-damaging to reservoir rocks, inert and miscible in various reservoir volume fluids, and recoverable without contamination. As described in one or more embodiments, the de-liquefied LNG 328 used for pressuring the reservoir volume 302 is also used as a fracturing fluid to stimulate and increase the rate of fluid recovered from the pressured reservoir volume 302.

The fracturing pump system 336 receives a second stream of LNG 338 from the cryogenic pump 324. The fracturing pump system 336 includes a fracturing pump 340, such as a high-pressure LNG pump, and a heating unit 342. The fracturing pump 340 receives and pressures the second stream of LNG 338 at a fracturing pressure sufficient to fracture the reservoir volume 302. A pressurized LNG 346 flows into the heating unit 342 to be heated and vaporized into natural gas, e.g., de-liquefied LNG 348. The de-liquefied LNG 348, acting as a fracturing fluid, is injected in the well 306 to flow into perforations 350 at a fracturing pressure sufficient to re-stimulate and generate fractures 352 in the reservoir volume 302. Before injection into the well 306, the de-liquefied LNG 348 may flow into a mixer 354 to be admixed with a stimulation material 356, such as viscosifier agents, carrier aqueous fluids, proppants, demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, non-emulsifiers, foamers, nanoparticles-stabilized foams, oxygen scavengers, pH control agents, and buffering agents, and the like. The combination of the de-liquefied LNG 348 and the stimulation material 356 provides a fracturing fluid 358 capable of re-stimulating and re-fracturing the reservoir volume 302. The mixer 354 may include static or dynamic mixing devices, diverters, and turbulizers, among others.

The stimulation material 356, as described, may include acidic agents, such as a regular acid or a salt of hydrochloric acid (HCl) where the salt is thioamide, urea, glycine, or an amino acid such as tryptophan, proline, valine, among others. The acidity of some of the acidic agents increases in the presence of water at certain concentrations. For example, HCl is soluble in the presence of water and other aqueous solutions but insoluble and thus, non-acidic in the presence of other well fluids, e.g., oil, gas, hydrocarbons, corrosion inhibitors, surfactants, foaming agents, and nanoparticles. Removing water from the well 306 or from the formation 301 is not feasible since water naturally forms in the reservoir volume 302 and is often injected into the formation 301 during fracturing operations. Therefore, using de-liquefied LNG 348 in the presence of the acidic agents mitigates the acidic impact caused by acidic agents in the presence of the water and other aqueous based solutions.

The injection location, pressure, flow rate, fluid composition, and/or other parameters of the de-liquefied LNG 348 may be modified to improve sweep efficiency and rates of recovery. In some examples, the de-liquefied LNG 348, as a fracturing fluid, is water-based and can be commingled with an aqueous solution to aid in load recovery, i.e., the amount of fracturing fluid produced back, after stimulating and fracturing the reservoir volume 302. The de-liquefied LNG 348 can also be foam-based to transport additional agents commingled in the fracturing fluid, such as proppants, diverter materials, solid acids, and scale inhibitors, among others surface active agents. In some cases, before de-liquefying, a stream of the LNG 316 is injected into the well 302 as a fracturing fluid, with or without the stimulation material 356, to re-fracture the formation 302.

Figure 3B:
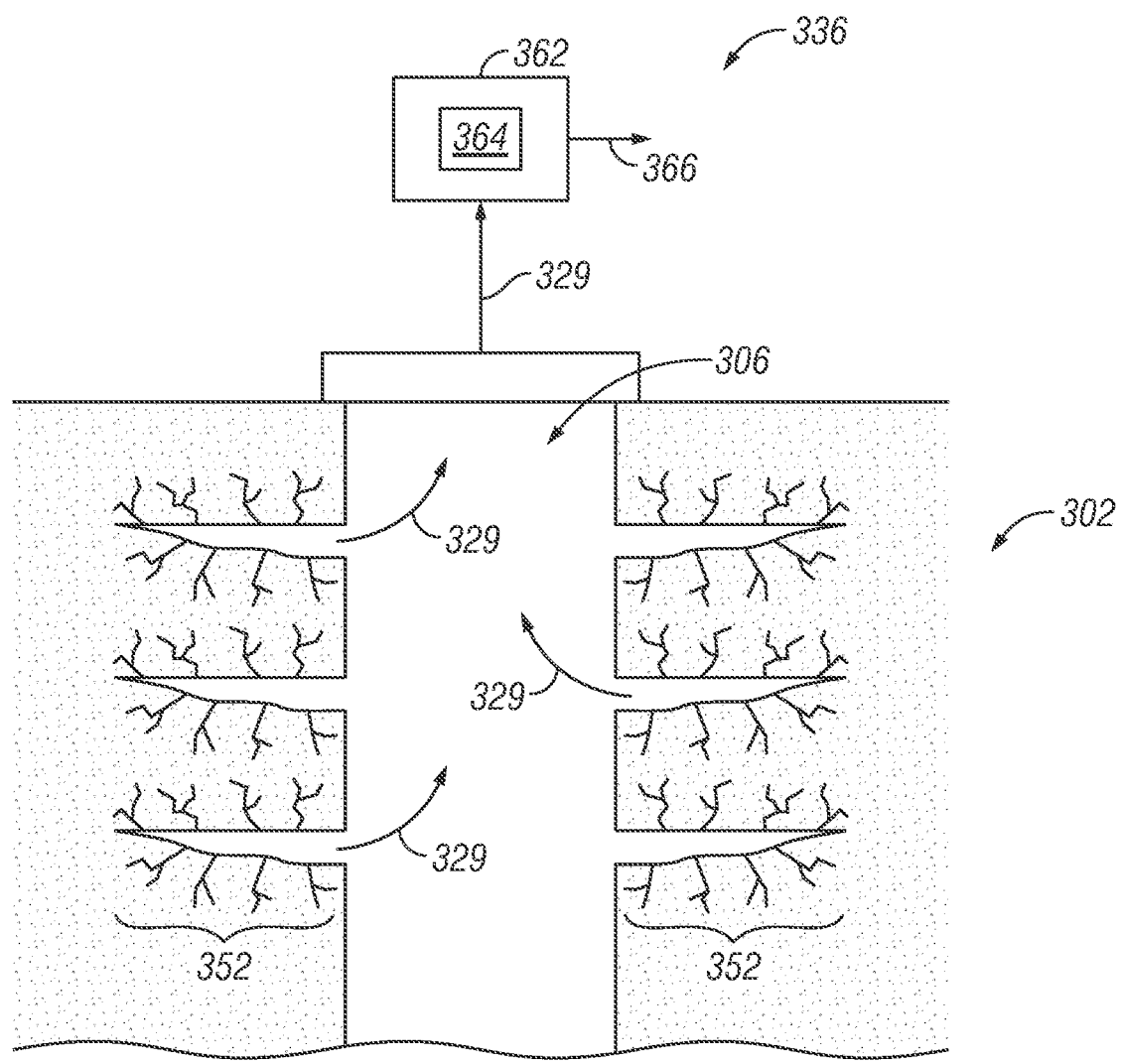
FIG. 3B is schematic view of an example recovery and separation system in the example fracturing pump system of FIG. 3A, according to one or more embodiments.

FIG. 3B is schematic view of an example recovery and separation system 362 in a fracturing pump system 336 of FIG. 3A, according to one or more embodiments. The de-liquefied LNG 328, 348 of FIG. 3A that flows into the well 306 is miscible in fluids 329 recovered from the reservoir 302. The de-liquefied LNG 328, 348 that is in solution with the recovered fluids 329 is releasable using various techniques, such as flash liberation and differential liberation, among others. As shown in FIG. 3B, the recovered fluids 329 released from the reservoir 302 may flow into the well 306 and into a processing facility 362. The processing facility 362 includes one or more separators 364 to separate out the various components within the recovered fluids 329, such as the de-liquefied LNG 328, 348 previously injected into the well 306 for pressuring and fracturing the reservoir 302. The recovered de-liquefied LNG 366 flows from the processing facility 362 to be further processed and/or later sold or further used other operations.

It should be clearly understood that FIGS. 3A and 3B merely depict one embodiment of an application of the principles of this disclosure in practice, and a wide variety of other embodiments are possible. Therefore, the scope of this disclosure is not limited at all to the details of FIGS. 3A and 3B described herein and/or depicted in the additional drawings. For example, instead of using the fracturing pump system 336 to generate and flow de-liquefied LNG 348 into the well 306, the cryogenic pump 324 can be rated to pressurize the LNG 316 at a fracturing pressure sufficient to fracture the formation 301 after re-pressuring. Further, the heater 326 can be used to heat and vaporize the LNG 316 to generate the de-liquefied LNG 348 before being injected into the well 306 as a fracturing fluid.

Figure 4:
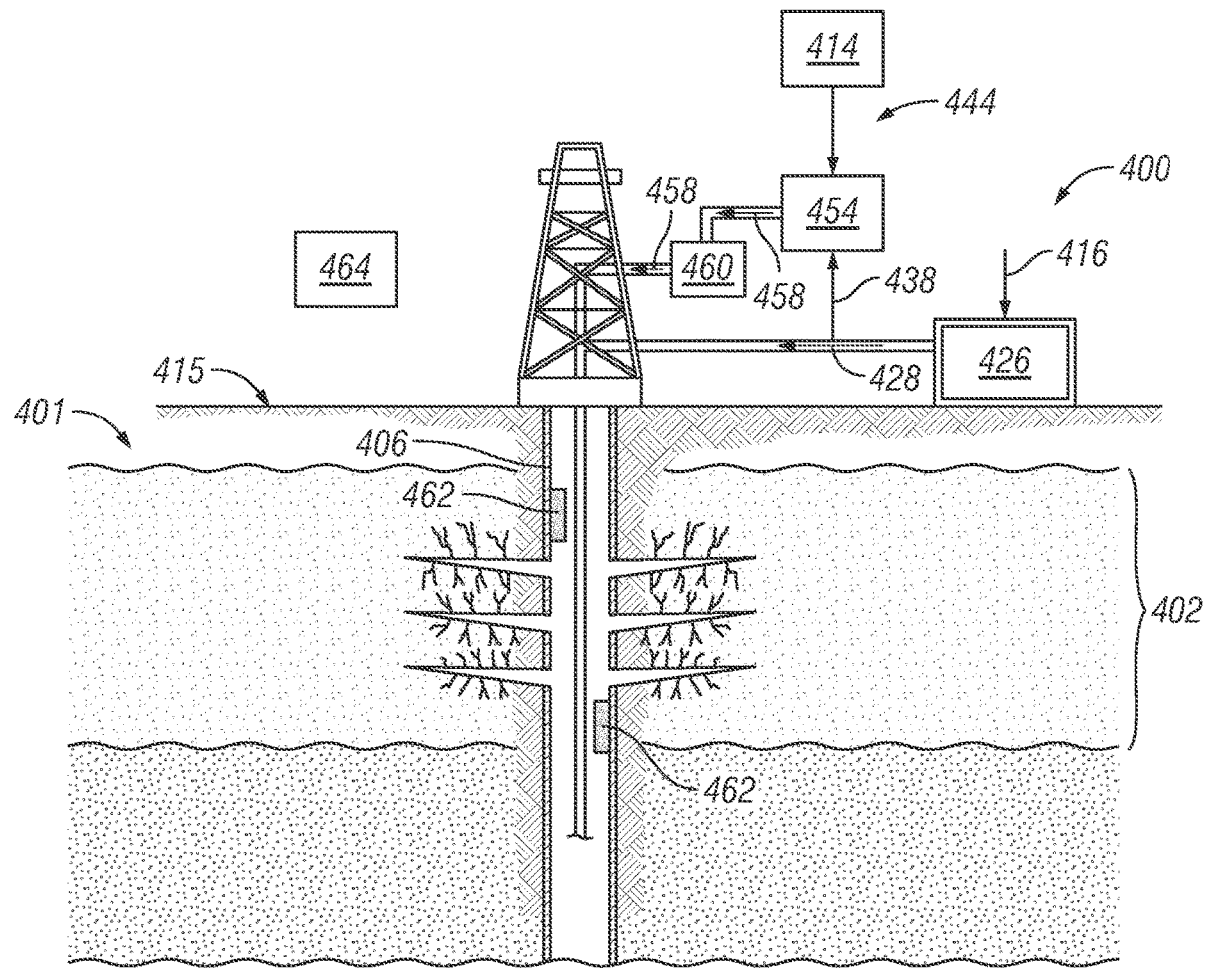
FIG. 4 is a schematic view of an example LNG pressuring system and an example tracer injection system, according to one or more embodiments.

FIG. 4 is a schematic view of an example LNG pressuring system 400 and an example tracer injection system 444, according to one or more embodiments. As described with respect to FIG. 3A, a heating unit 426 heats and vaporizes LNG 416 to generate de-liquefied LNG 428, e.g., natural gas. To increase the pressure of a reservoir volume 402, a first stream of de-liquefied LNG 428 is injected into a well 406 to flow into a reservoir volume 402, as described with respect to FIG. 1.

Well and reservoir monitoring of the first stream of de-liquefied LNG 428, among other components within the well 406 and formation 401, can be traced and monitored using tracers 414. In general, tracers 414 are chemical compounds that are injected into the well 406 to trace and analyze the flow of fluids in the well 406 and/or a formation 401 during various operations, such as reservoir pressurization and fluid recovery. The tracers 414 can observe and track well and reservoir conditions, such as, the injection profile of injected fluids, the extent of injected fluid recovery, the influx of water, the amount of fluids produced from the well 406, the location of fractures, and the like. In the embodiments, the tracers 414 can be injected during the re-pressuring of the reservoir volume 402 or during fracturing of the re-pressurized volume as described with respect to FIG. 3A.

The tracers 414 can include various tracer compounds including tritiated methane ($CH_3T$), $CH_2TCH_3$; 2-t propane ($CH_3CHTCH_3$) Krypton 85 ($^{85}Kr$), radio-carbon dioxide ($^{14}CO_2$), xenon-133 ($^{133}Xe$), xenon-127 ($^{127}Xe$), perfluorodimethylmethylcyclohexane (PDMCH), perfluoromethylcyclopentane (PMCP), Perfluoromethylcyclohexane (PMCH), 1,2-perfluorodimethylcyclohexane (1,2-PDMCH), 1,3-perfluorodimethylcyclohexane (1,3-PDMCH), perfluoroethyl-cyclohexane (PECH), freon-11, freon-12, freon-113, perdeuterated methane ($CD_4$), $d_6$-ethane ($C_2D_6$), $d_6$-ethane ($C_3D_8^3$), nitrogen (N2), carbon dioxide, helium, and volatile surfactants, among other tracers, that maintain a gaseous state under downhole conditions and that include low detection limits and resistant to downhole conditions. The tracers 414 can include various types of tracers including, but not limited to, radioactive tracers, non-radioactive tracers, noble gas tracers, chemical tracers, and the like.

To monitor various characteristics and fluids in the well 406, including the injected de-liquefied LNG 428, the tracer 414 is mixed with a second stream of de-liquefied LNG 438. For example, a mixer 454 admixes the second stream of the de-liquefied LNG 438 with the tracer 414 to form an injectable tracer material 458. The tracer material 458 is continuously injected into the well or in a spiked or single injection process using injection equipment 460. The injection equipment 460 can include tubing, pipes, pumps, compressors, or other equipment to flow the tracer material 458 through the well 406 and/or into the formation 401. The tracer material 458 flows through the formation 401 to be produced back into the well 406, for example, at a location where the tracer material 458 originally entered or leaked from a fracture formed in the formation 401. In some cases, the first stream of de-liquefied LNG 428 can be considered as a tracer material and solely injected into the well 406 without the tracer 414 after pressuring the reservoir volume 402.

The de-liquefied LNG 438 is suitable for use as a tracer due to a pure methane ($CH_4$) content and a non-detectable presence at a measurable level in the reservoir fluids recovered from the well 406. Further, the de-liquefied LNG 438 does not interfere or interact undesirably with reservoir fluids, e.g., oil, gas, water, hydrocarbons, etc., and is injected into the well 406 at concentrations above detection limits. The detection limits may include, for example, at about five (5) parts per trillion to about 1,000 parts per million and more, preferably at a range of about 100 parts per trillion to about 100 parts per million.

In operation, the de-liquefied LNG 438 that is produced back into the well 406 is detected by one or more tracer detectors 462 installed in the well 406 and/or at a ground surface 415. The tracer detectors 462 can include electrochemical detectors and gamma ray detectors, among other types of detectors and/or sensors. The tracer detectors 462 can detect and analyze characteristics of the de-liquefied LNG 438, such as the concentration of the de-liquefied LNG 438 in the fluids recovered from the formation 401 and/or well 406. In addition to data related to concentrations, the parameter data can include data related to the time of de-liquefied LNG 438 detection, the location of the de-liquefied LNG 438 when detected, the amount of de-liquefied LNG 438 detected, and the like. A computing system 464 may receive and analyze the parameter data from the trace detectors 462. For instance, the computing system 464 analyzes the parameter data to provide information related to various characteristics of the formation 401 and/or the well 406, for example, information related to the pressure of the first stream of de-liquefied LNG 428 injected into the well to pressurize the reservoir volume 402.

It should be clearly understood that the fracturing system of FIG. 4 is merely one embodiment of an application of the principles of this disclosure in practice, and a wide variety of other embodiments are possible. Therefore, the scope of this disclosure is not limited at all to the details of FIG. 4 described herein and/or depicted in the additional drawings.

Figure 5:
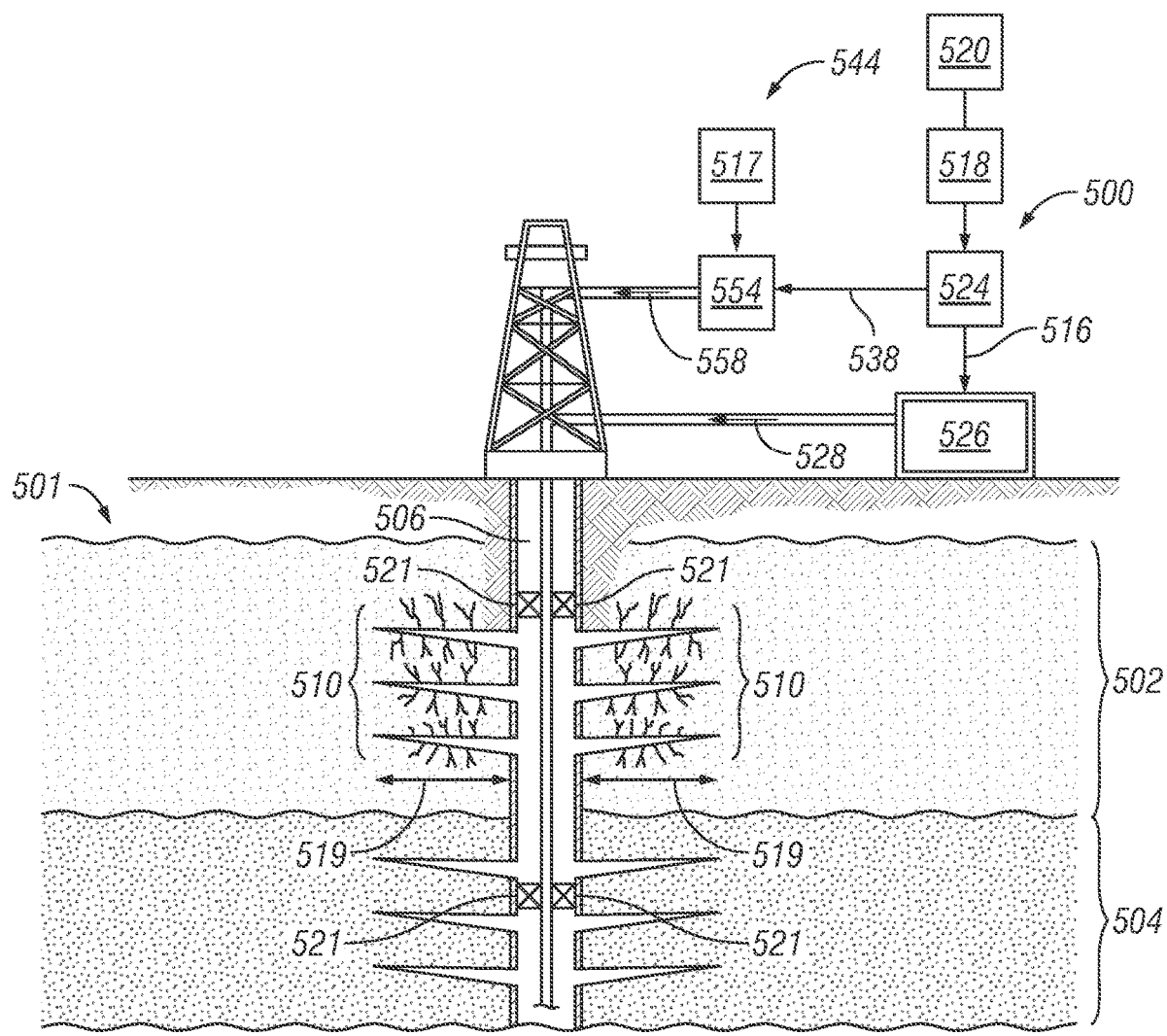
FIG. 5 is a schematic view of an example LNG pressuring system and an example treatment system, according to one or more embodiments.

FIG. 5 is a schematic view of an example LNG pressuring system 500 and an example treatment system 544, according to one or more embodiments. A formation 501 includes a reservoir volume 502 composed of porous and permeable rocks that contain fluids, e.g., oil, gas, hydrocarbons, water. A well 506 is drilled to penetrate the formation 501 to carry out exploration and production of fluids from the reservoir volume 502. However, after production, the reservoir volume 502 may be depleted of pressure and incapable of further production. In some cases, natural gas is injected into the well 506 using the LNG pressuring system 500 to re-pressurize the reservoir volume 502 for subsequent re-stimulation and production of additional fluids from the well 502.

LNG is transported to and stored in a LNG source vessel 518 at an on-site location of the well 506. The LNG source vessel 518 can include a cooling system or a separate cooling system 520 can be located at the on-site location to maintain the LNG at or below cryogenic temperatures, e.g., −260° F. (−162° C.). As described with respect to FIG. 1, a cryogenic pump 524 supplies a feed pressure to flow a first stream of LNG 516 the into a heating unit 526. The heating unit 526 heats and vaporizes the first stream of LNG 516 into the natural gas, e.g., de-liquefied LNG 528. Once in a gaseous state, the de-liquefied LNG 528 flows into the well 506 to increase the reservoir pressure of the reservoir volume 502. Pressuring the reservoir volume 502 mitigates or reduces asymmetrically-induced fracturing in the direction of the well 506. Further, after pressuring, production operations from the well 506 may be re-established to recovery any remaining fluids in the reservoir volume 502 or bypassed in the adjacent reservoir volume 504.

However, various physical and chemical factors reduce the permeability of the reservoir volume 502 to flow the fluids, thus, leading to a reduction in fluid recovery. For example, various fluids injected into the well 506 during operations, such as drilling, completion, and production operations, can cause damage to the formation 501 and/or well 506. Additionally, reactions among drilling fluids, production fluids, and formation fluids, such as emulsification due to oil/water incompatibilities, the precipitation of solids, the creation of an immiscible fluid, and water saturation, among others, can limit gas and oil permeabilities. Other damaging factors include organic and inorganic scale formation and depositions, fines production and accumulation, mechanical damage, microorganism growth, and the like.

Chemical agents 517 are injected into the well 506 to combat such physical and chemical factors. The chemical agents 517 may improve the natural formation permeability around the well 506 by removing formation damage, dissolving material plugging pore spaces of the reservoir volume 502, or by enlarging the pore spaces, for example. The chemical agents 517 include, but are not limited to, acids (e.g., hydrochloric acid (HCl)), organic acids (e.g., formic, acetic, methanesulfonic), salts (e.g., hydrocholoride salts "HCL-adducts") where the salt includes thioamide, urea, glycine, or an amino acid, among others, chelating agents (e.g., N-phosphonomethyliminodiacetic acid (PMIDA), methylglycindiacetic acid (MGDA), glutamic acid N,N-diacetic acid (GLDA), hydroxyethyl ethylenediamine tri-acetic acid (HEDTA), citric acid, malic acid, tartaric acid, succinic acid, gluconic acid, lactic acid), surfactants, emulsions, and microemulsions, diverting agents, corrosion inhibitors, scale inhibitors, foaming agents, and chemically-active nanoparticles and particulates, among others.

In one or more embodiments, a second stream of LNG 538 and the chemical agents 517 flow into a mixer 554 to form a treatment fluid 558 that is thereafter injected into the well 506. In examples, the second stream of LNG 538 may be in a gaseous state (i.e., de-liquefied LNG) or a gas/liquid mixture of natural gas upon entering the well 506. The second stream of LNG 538 combined with the chemical agent 517 provides an enhanced treatment solution to remove formation and well damage. The treatment fluid 558 lands at a near wellbore region 519 of the formation 501 or in an area of reduced permeability around the well 506. As described herein, the near-wellbore region 519 is the subterranean material and rock surrounding the well 506 and is considered the region within about 100 feet (ft) of the well 506. The treatment fluid 558 flows into the well 506 and into the fractures 510 propagating through the reservoir volume 502 that have been damaged during the course of the drilling and the production operations. The treatment fluid 558 is used to carry out pre-fracturing treatments, fracture clean-out treatments, scale and deposit removal treatments, emulsion removal treatments, and corrosion inhibition, among others. The treatment fluid 558 can be injected during or after re-pressuring of the reservoir volume 502.

Using the LNG 538 as a component of the treatment fluid 558 changes the physiochemical characteristics of one or more chemical agents 517, for instance, the LNG 538 modulates or adjusts the reactive force of the agents 517 when in the presence of water. For example, one or more chemical agents injected into the well 506 can react with a metal surface, such as a metal surface of a packer 521, to induce corrosion. Further, one or more of the chemical agents 517 may react with water injected or naturally found in the well 506 to produce an acidic solution. However, injecting the second stream of LNG 538 with the chemical agents 517 reduces or mitigates the acidic nature of the chemical agents 517 to reduce corrosion or other damaging effects in the well 506 and or formation 501. In some cases, an injection rate of the second stream of LNG 538 is adjusted to control the corrosion rate of the surfaces susceptible to corrosion, such as the packer 521.

It should be clearly understood that the fracturing system of FIG. 5 is merely one embodiment of an application of the principles of this disclosure in practice, and a wide variety of other embodiments are possible. Therefore, the scope of this disclosure is not limited at all to the details of FIG. 5 described herein and/or depicted in the additional drawings.

In addition, to the embodiments described above, many examples of specific combinations are within the scope of the disclosure, some of which are detailed below:

Example 1

A method for pressurizing and stimulating a formation with a parent well therethrough, the method comprising: storing and de-liquefying liquefied natural gas (LNG) at an on-site location near the parent well; injecting a first stream of de-liquefied LNG into the parent well to pressurize the formation; and injecting a second stream of de-liquefied LNG into the parent well at a fracturing pressure sufficient to fracture the pressurized formation.

Example 2

The method of Example 1, further comprising pressurizing and vaporizing the first stream of de-liquefied LNG to form natural gas.

Example 3

The method of Example 1, further comprising injecting the first stream of de-liquefied LNG into the parent well to pressurize a reservoir volume of the formation.

Example 4

The method of Example 1, further comprising drilling a child well after pressurizing the reservoir volume through the parent well.

Example 5

The method of Example 1, further comprising: introducing the second stream of de-liquefied LNG into the parent well at a fracturing pressure after pressurizing the formation; and injecting the pressurized second stream of de-liquefied LNG into the parent well until the formation is fractured.

Example 6

The method of Example 1, further comprising: admixing a stimulation material with the second stream of de-liquefied LNG to form a fracturing fluid; and injecting the fracturing fluid into the parent well at a fracturing pressure sufficient to fracture the pressurized formation.

Example 7

The method of Example 6, wherein the fracturing fluid further comprising a base fluid selected from the group consisting of viscosifier agents, carrier aqueous fluids, proppants, demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, non-emulsifiers, foamers, nanoparticles-stabilized foams, oxygen scavengers, pH control agents, and buffering agents.

Example 8

The method of Example 1, further comprising pressurizing the formation through the parent well with the first stream of de-liquefied LNG sufficiently to decrease asymmetric fracturing of the formation towards the parent well during fracturing of a child well.

Example 9

The method of Example 8, further comprising, after stimulating the child well, injecting the second stream of de-liquefied LNG into the parent well at a fracturing pressure sufficient to fracture the pressurized formation.

Example 10

The method of Example 1, further comprising storing the LNG at the on-site location as a processed cryogenic fluid at or below a temperature of about −260 Fahrenheit (° F.) (−162 Celsius (° C.)).

Example 11

The method of Example 1, further comprising recovering a portion of the de-liquefied LNG after pressurizing the formation.

Example 12

The method of claim 1, further comprising: injecting a portion of the LNG as a tracer material into the parent well; and detecting the injected portion of LNG to infer information related to at least one of the parent well or the formation.

Example 13

A system for pressurizing and stimulating a formation with a parent well therethrough; the system comprising: a source of liquefied natural gas (LNG) located at an on-site location of the parent well; a cryogenic system located at the on-site location and comprising a pumping unit and a heating unit to de-liquefy LNG into natural gas; natural gas injection equipment comprising an injection pump configured to inject a first stream of natural gas into the parent well to pressurize the formation; and fracturing fluid injection equipment comprising a fracturing pump operable to pressure a second stream of natural gas to a fracturing pressure sufficient to fracture the formation.

Example 14

The system of Example 13, further comprising: a child well formed therethrough the formation; wherein the child well is stimulated before fracturing the formation with the second stream of natural gas; and and wherein the child well is stimulated after pressurizing the formation with the first stream of natural gas.

Example 15

The system of Example 13, wherein the pumping unit and the heating unit are operable to pressurize and vaporize the LNG into natural gas.

Example 16

The system of Example 13, wherein the source comprises a storage container configured to store the LNG at or below a temperature of about −260 Fahrenheit (° F.) (−162 Celsius (° C.)).

Example 17

The system of Example 13, further comprising a mixer to admix a stimulation material with the second stream of natural gas to form a fracturing fluid used to fracture the formation.

Example 18

The system of Example 14, wherein the fracturing fluid further comprising a base fluid selected from the group consisting of viscosifier agents, carrier aqueous fluids, proppants, demulsifiers, corrosion inhibitors, friction reducers, clay stabilizers, scale inhibitors, biocides, breaker aids, mutual solvents, alcohols, surfactants, anti-foam agents, defoamers, viscosity stabilizers, iron control agents, diverters, emulsifiers, non-emulsifiers, foamers, oxygen scavengers, nanoparticles-stabilized foams, pH control agents, and buffering agents.

Example 19

The system of Example 13, wherein a portion of the LNG is injectable as a tracer material into the parent well, wherein the injected portion of the LNG is detectable to infer information related to at least one of the parent well or the formation.

Example 20

The system of Example 13, wherein fluids in a reservoir volume of the formation are near, at, or below a bubble point of the reservoir fluids.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the previous discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for re-pressurizing and stimulating a formation with a parent well therethrough, wherein the formation is depleted and has (i) a pressure lower than pressures occurring during primary hydrocarbon production and (ii) fluids at or below a bubble point of the fluids, the method comprising:

storing liquefied natural gas (LNG) at an on-site location of the parent well;

de-liquefying a first stream of the LNG into a first stream of natural gas at the on-site location;

injecting the first stream of natural gas into the parent well to re-pressurize the formation to a pressure occurring during the primary hydrocarbon production;

drilling a child well; and fracturing the formation through the child well after the re-pressurizing of the formation; and thereby decreasing asymmetric fracturing from the child well towards the parent well.

2. The method of claim 1, further comprising the injecting of the first stream of natural gas into the parent well to re-pressurize a depleted reservoir volume of the formation.

3. The method of claim 2, further comprising drilling the child well after the re-pressurizing of the reservoir volume.

4. The method of claim 1, wherein the storing of the LNG at the on-site location comprises storing the LNG as a processed cryogenic fluid.

5. The method of claim 1, further comprising recovering a portion of the first stream of natural gas from the parent well after the re-pressurizing of the formation.

6. The method of claim 1, further comprising: injecting a tracer material into the parent well with the first stream of natural gas; and detecting the injected tracer material to infer information related to at least one of the parent well or the formation.

7. The method of claim 1, further comprising:
de-liquefying a second stream of the LNG into a second stream of natural gas at the on-site location; and
injecting the second stream of natural gas into the parent well at a fracturing pressure sufficient to fracture the re-pressurized formation.

8. The method of claim 7, wherein the de-liquefying of the first stream of LNG further comprises pressurizing and vaporizing the first stream of LNG and;
wherein the de-liquefying of the second stream of LNG further comprises pressurizing and vaporizing the second stream of LNG.

9. The method of claim 7, wherein the injecting of the second stream of natural gas into the parent well at the fracturing pressure sufficient to fracture the re-pressurized formation further comprises:
introducing the second stream of natural gas into the parent well at the fracturing pressure after the re-pressurizing of the formation; and
injecting the second stream of natural gas into the parent well at the fracturing pressure until the re-pressurized formation is fractured.

10. The method of claim 7, wherein the injecting of the second stream of natural gas into the parent well at the fracturing pressure sufficient to fracture the re-pressurized formation further comprises:
admixing a stimulation material with the second stream of natural gas to form a fracturing fluid; and
injecting the fracturing fluid into the parent well at the fracturing pressure sufficient to fracture the re-pressurized formation.

11. The method of claim 10, wherein the stimulation material is selected from the group consisting of viscosifier agents, carrier aqueous fluids, proppants, demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, non-emulsifiers, foamers, nanoparticles-stabilized foams, oxygen scavengers, pH control agents, and buffering agents.

12. The method of claim 7, further comprising, after the fracturing of the formation through the child well, injecting the second stream of natural gas into the parent well at the fracturing pressure sufficient to fracture the re-pressurized formation.

13. The method of claim 1, further comprising drilling the child well before the re-pressurizing of the formation.

14. A system for re-pressurizing and stimulating a formation with a parent well therethrough, wherein the formation is depleted and has (i) a pressure lower than pressures occurring during primary hydrocarbon production and (ii) fluids at or below a bubble point of the fluids; the system comprising:
a child well formed through the formation;
a source of liquefied natural gas (LNG) located at an on-site location of the parent well;
a cryogenic system located at the on-site location and comprising a pumping unit and a heating unit, the cryogenic system operable to de-liquefy a first stream of the LNG into a first stream of natural gas;
natural gas injection equipment comprising an injection pump configured to inject the first stream of natural gas into the parent well to re-pressurize the formation to a pressure occurring during the primary hydrocarbon production, and thereby decrease asymmetric fracturing from the child well towards the parent well; and
fractures in the formation, wherein the fractures are formed from the child well after the formation is re-pressurized with the first stream of natural gas.

15. The system of claim 14, wherein the pumping unit and the heating unit are operable to pressurize and vaporize the first stream of the LNG into the first stream of natural gas.

16. The system of claim 14, wherein the source comprises a storage container configured to store the LNG as a processed cryogenic fluid.

17. The system of claim 13, further comprising a tracer material injectable with the first stream of natural gas into the parent well, wherein the injected tracer material is detectable to infer information related to at least one of the parent well or the formation.

18. The system of claim 14, further comprising:
wherein the cryogenic system is further operable to de-liquefy a second stream of the LNG into a second stream of natural gas; and
fracturing fluid injection equipment comprising a fracturing pump operable to pressurize the second stream of natural gas to a fracturing pressure sufficient to fracture the re-pressurized formation.

19. The system of claim 18, further comprising a mixer to admix a stimulation material with the second stream of natural gas to form a fracturing fluid used to fracture the re-pressurized formation.

20. The system of claim 19, wherein the stimulation material is selected from the group consisting of viscosifier agents, carrier aqueous fluids, proppants, demulsifiers, corrosion inhibitors, friction reducers, clay stabilizers, scale inhibitors, biocides, breaker aids, mutual solvents, alcohols, surfactants, anti-foam agents, defoamers, viscosity stabilizers, iron control agents, diverters, emulsifiers, non-emulsifiers, foamers, oxygen scavengers, nanoparticles-stabilized foams, pH control agents, and buffering agents.

* * * * *